United States Patent [19]
Ryan

[11] Patent Number: 5,977,745
[45] Date of Patent: Nov. 2, 1999

[54] METHOD AND APPARATUS FOR DETECTING LOOSE TYPE BATTERY CELLS IN A RECHARGING DEVICE

[75] Inventor: Sean P. Ryan, Wake Forest, N.C.

[73] Assignee: Ericsson, Inc., Research Triangle Park, N.C.

[21] Appl. No.: 09/062,431

[22] Filed: Apr. 17, 1998

[51] Int. Cl.$^6$ .......................... H01M 10/46; H01M 10/44
[52] U.S. Cl. ............................................. 320/106; 320/110
[58] Field of Search ................................... 320/106, 107, 320/110, 112, 113, 115, 116

[56] References Cited

U.S. PATENT DOCUMENTS

| | | | |
|---|---|---|---|
| 4,577,144 | 3/1986 | Hodgman et al. | 320/106 |
| 4,602,202 | 7/1986 | Mundschenk et al. | 320/106 |
| 5,661,392 | 8/1997 | Imazeki | 320/106 |
| 5,717,315 | 2/1998 | Maeno et al. | 320/106 |
| 5,854,549 | 12/1998 | Paulick | 320/110 |

*Primary Examiner*—Edward H. Tso
*Attorney, Agent, or Firm*—Coats & Bennett, P.L.L.C.

[57] ABSTRACT

A loose type battery cell detection method and apparatus controls a battery charging circuit so as to disable recharging when loose battery cells are detected. A battery contact is disposed adjacent to a battery power source. If the battery power source is loose battery cells, the battery contact operatively engages the loose battery cells such that an electrical path is created from one loose battery cell to another via the battery contact. If the battery power source is a rechargeable battery pack, no electrical path between the battery power source and the battery contact is created. A battery detection circuit monitors the battery contact for an electrical signal, such as a voltage or current level above zero. While the electrical signal is detected, the battery detection circuit directly or indirectly causes the battery recharge function of the battery charging circuit of the recharging device to be disabled.

17 Claims, 5 Drawing Sheets

METHOD AND APPARATUS FOR DETECTING LOOSE TYPE BATTERY CELLS IN A RECHARGING DEVICE

FIELD OF THE INVENTION

The present invention relates generally to batteries for wireless communications devices, and more particularly to a method and apparatus for detecting loose type battery cells in a recharging device such as a wireless communications device.

BACKGROUND OF THE INVENTION

Wireless communications devices, such as cellular telephones, are typically designed to be portable and battery powered. Frequently, but not always, such battery power is supplied through rechargeable battery packs. The rechargeable battery packs include one or more rechargeable battery cells. After being drained, these rechargeable cells may be recharged by a recharging circuit of a recharging device. Typically, such recharging circuits are included as part of the wireless communications device so that battery cells may be used and recharged without disconnecting the battery pack from the wireless communications device. Alternatively, stand alone battery pack rechargers are readily available.

Despite the prevalence of rechargeable battery packs, some wireless communications devices allow for the optional use of loose off-the-shelf battery cells such as the common AA size battery. These loose off-the-shelf battery cells are typically not rechargeable. To the contrary, attempting to recharge such loose off-the-shelf battery cells may result in undesirable leaks, fires, or explosions. Accordingly, it is desirable that the wireless communications device be able to determine whether battery power is being supplied from a rechargeable battery pack or loose off-the-shelf battery cells. If power is being supplied from loose off-the-shelf battery cells, then recharging should be disabled.

SUMMARY OF THE INVENTION

The present invention provides a method and apparatus for controlling a battery charging circuit so as to disable recharging when loose battery cells are detected. A battery contact is disposed adjacent to a battery power source, which may for instance be a battery pack or a plurality of loose battery cells. If the battery power source is loose battery cells, the battery contact operatively engages the loose battery cells such that an electrical path is created from one loose battery cell to another via the battery contact. If the battery power source is a rechargeable battery pack, no electrical path between the battery power source and the battery contact is created. If an electrical signal is sensed on the battery contact, battery recharging is disabled.

One embodiment of the invention includes a battery charging circuit, a battery contact, and a battery detection circuit. The battery contact is disposed adjacent to a battery power source and may or may not form an electrical path with the battery power source as described above. The battery detection circuit monitors the battery contact for an electrical signal, such as a voltage or current level above zero. While the electrical signal is detected, the battery detection circuit directly or indirectly causes the battery recharge function of the battery charging circuit to be disabled.

DETAILED DESCRIPTION

Figure 1:
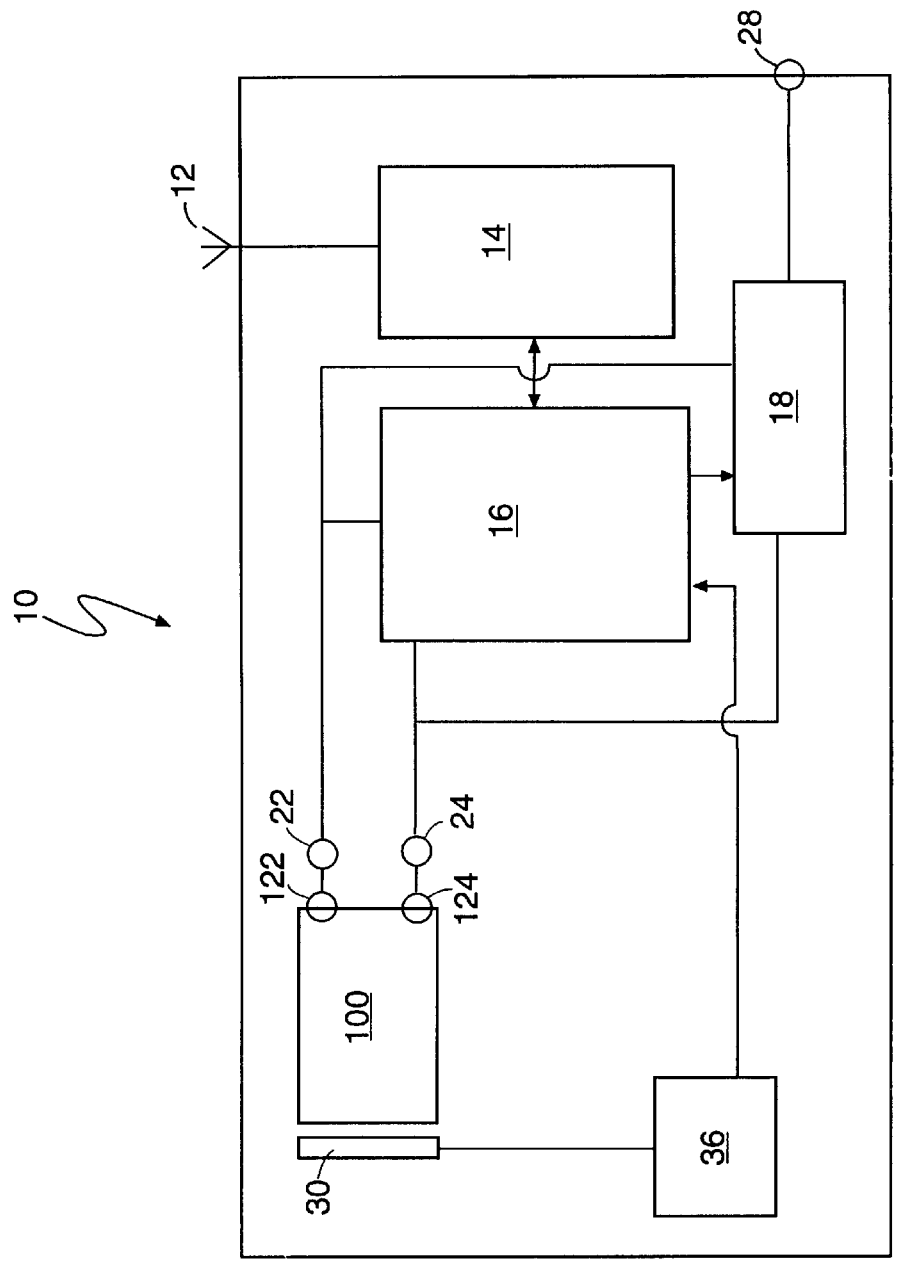
FIG. 1 is a simplified functional block diagram of a wireless communications device of the present invention with a battery power source attached.

The present invention utilizes a loose battery detection circuit 36 connected to battery contact 30 to detect the use of loose off-the-shelf battery cells 132 as a battery power source 100 attached to a battery recharging device. If the presence of loose battery cells 132 is detected, then the battery charging circuit 18 of the battery recharging device is disabled. In this manner, the possibility of fire, explosion, and the like is diminished.

As used herein, the term "battery recharging device" includes stand alone battery pack rechargers which draw power from external power sources, such as a wall outlet, and wireless communications devices which include battery recharging circuits 18. For clarity, a wireless communications device will be used as the illustrative example of a battery recharging device and will be indicated by the reference numeral 10.

A wireless communications device 10, such as a cellular telephone, is shown in FIG. 1. The wireless communications device 10 typically includes an antenna 12 coupled to a transceiver 14, a microprocessor 16, a battery charging circuit 18, and electrical terminals 22,24 for connection to the battery power source 100. The microprocessor 16 controls the overall function of the wireless communications device 10. The transceiver 14 encodes and decodes communication and control signals which are transmitted and received via the antenna 12. The battery charging circuit 18 converts power received from an external power source at an external power terminal 28 to a form suitable for recharging the battery power source 100. Typically, the battery charging circuit 18 operates under the control of the microprocessor 16. When the wireless communications device 10 is not coupled to external power, the wireless communications device 10 receives power from the battery power source 100 via a plurality of terminals 22,122,24,124. Further details of the arrangement and functioning of wireless communications devices 10 are well known in the art and are not important to understanding the present invention.

In addition, the wireless communications device 10 includes a battery contact 30 connected to loose battery detection circuit 36. For instance, the battery contact 30 may be soldered, crimped, or otherwise attached to a circuit board with circuit traces or wires connecting the battery contact 30 to the loose battery detection circuit 36. The loose battery detection circuit 36 is in communication with the microprocessor 16 or alternatively with the battery charging circuit 18.

Figure 2:
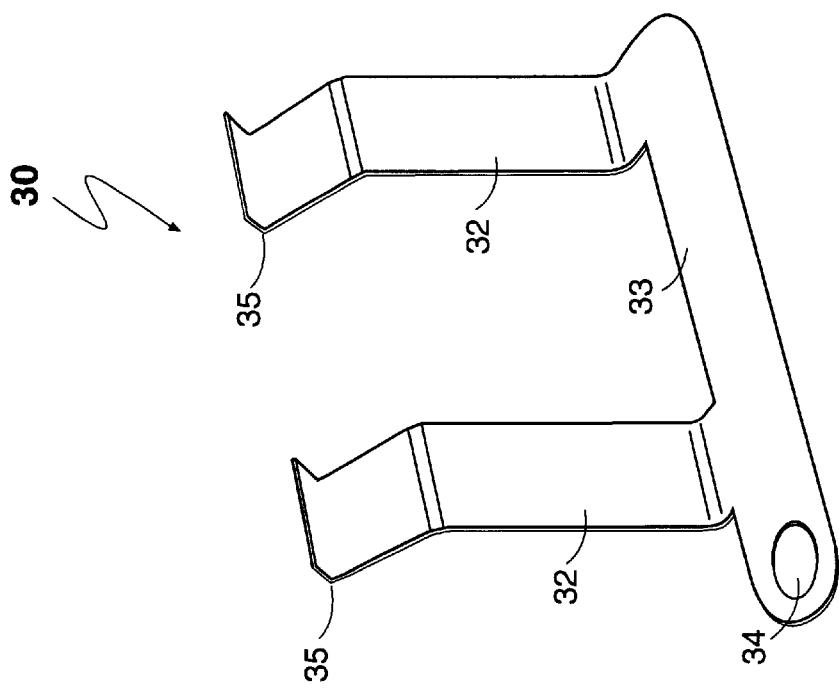
FIG. 2 is a perspective view of one possible configuration of the battery contact.

One possible configuration of the battery contact 30 is shown in FIG. 2. The battery contact 30 of FIG. 2 is preferably formed from a single piece of spring metal such as beryllium copper, but other electrically conductive materials would suffice such as phosphor bronze. Alternatively, the battery contact 30 may be in the form of flexible circuitry, or a molded conductive interconnect device, or a contoured printed circuit board, or the like. The battery contact 30 of FIG. 2 has two flexible arms 32 extending up from a base 33. Each flexible arm 32 has a v-shaped contact portion 35 on the end opposite the base 33. The contact portions 35 extend into the space intended for the battery power source 100. When a battery power source 100 is present, the contact portions 35 make physical contact with the external portion of battery power source 100, thereby slightly deflecting the flexible arms 32. As discussed below, the contact between the contact portions 35 and the battery power source 100 may form an electrical connection in the case of loose battery cells 132 or may only form a physical contact with the insulation 118 of a rechargeable battery pack 110. Any electrical current flowing between the flexible arms 32 will flow through the base 33. Preferably, the connection between the loose battery detection circuit 36 and the battery contact 30 is via the base 33, such as by a screw through the hole 34 in the base 33. While one configuration of the battery contact 30 is shown in FIG. 2, a wide variety of alternative configurations are possible, including, for instance, coil springs connected by a base 33. Any physical configuration which provides an electrical path between loose battery cells 132 will suffice.

Figure 3:
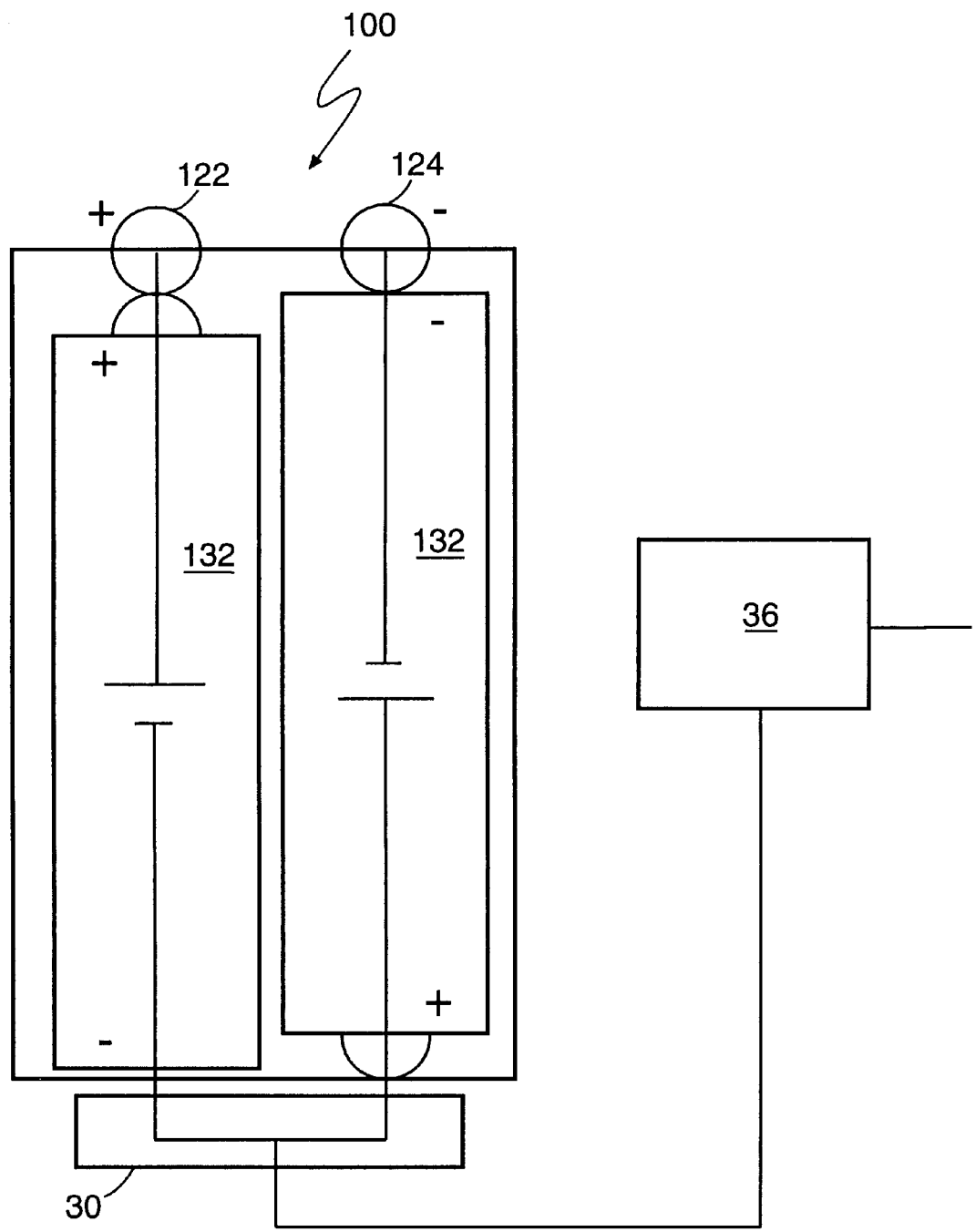
FIG. 3 is a schematic representation of a loose battery cell configuration of a battery power source showing the electrical connection between the loose battery cells and the battery contact of the present invention.

Turning to FIG. 3, the battery power source 100 may include a plurality of loose off-the-shelf battery cells 132 connected in series. When inserted in the wireless communications device 10, the loose battery cells 132 make electrical contact with the battery contact 30 such that the battery contact 30 is electrically between the positive terminal of one loose battery cell 132 and the negative terminal of another loose battery cell 132. In this manner, the battery contact 30 becomes at least part of the circuit path of the battery power source 1 00. It should be noted that, to ensure proper electrical contact, the particular physical geometry of the battery contact 30 will vary depending on the size or type of loose battery cells 132 expected to be encountered. The stored electrical power from the loose battery cells 132 is routed to the wireless communications device 10 via the positive power terminals 22,122 and the negative power terminals 24,124 in a conventional manner.

When connected as shown in FIG. 3, there should be some voltage level or current associated with the battery contact 30. This voltage or current is detected by the loose battery detection circuit 36 which in turn communicates with the microprocessor 16 to cause the battery recharge function of the battery charging circuit 18 to be disabled. Alternatively, the loose battery detection circuit 36 is directly connected to, or part of, the battery charging circuit 18 and likewise functions to disable any battery recharge function.

It is believed that even "dead" battery cells have some residual voltage potential and can generate a current when connected together. As such, the battery contact 30 will have an associated voltage level or current even when the loose battery cells 132 are "dead." To ensure that battery charging is disabled, it is therefore preferred that the loose battery detection circuit 36 be very sensitive such that even low voltage levels and current may be detected. Alternatively, a less sensitive loose battery detection circuit 36 may be employed which would not detect very low voltage levels or currents and would therefore allow transient charging of loose battery cells 132 until a tripping voltage level or current is reached which would trip the loose battery detection circuit 36 to disable charging.

Figure 4:
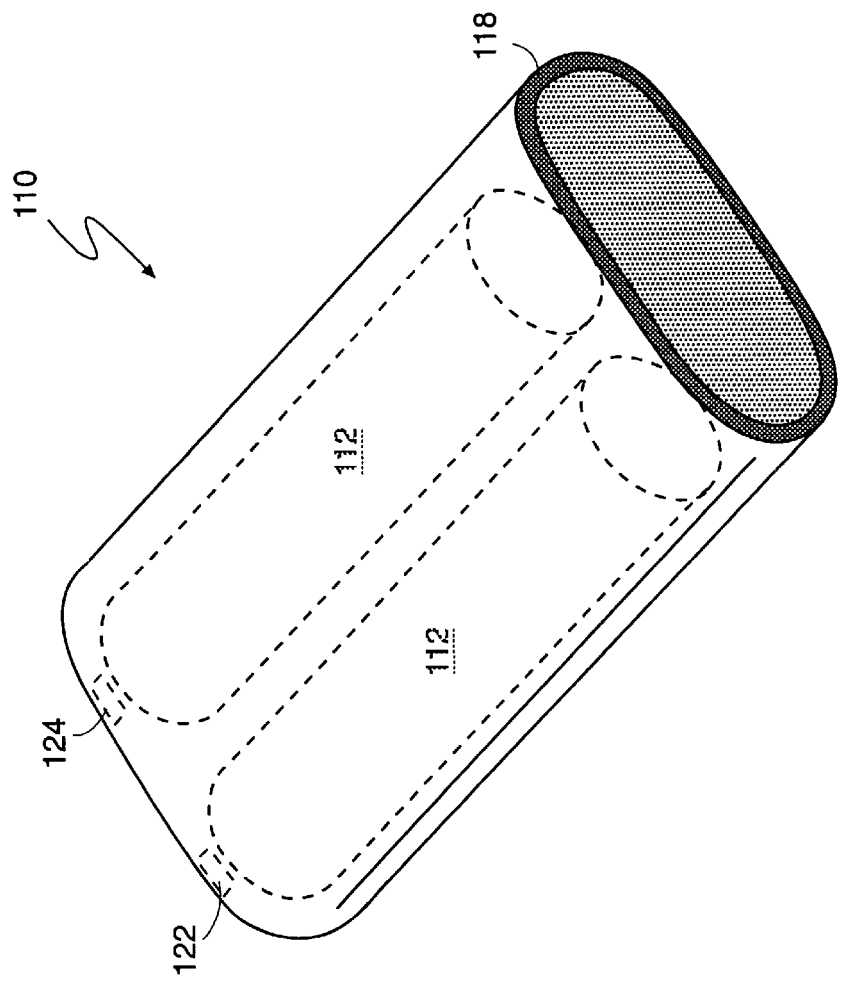
FIG. 4 is a perspective view of a battery pack for use with the present invention.
Figure 5:
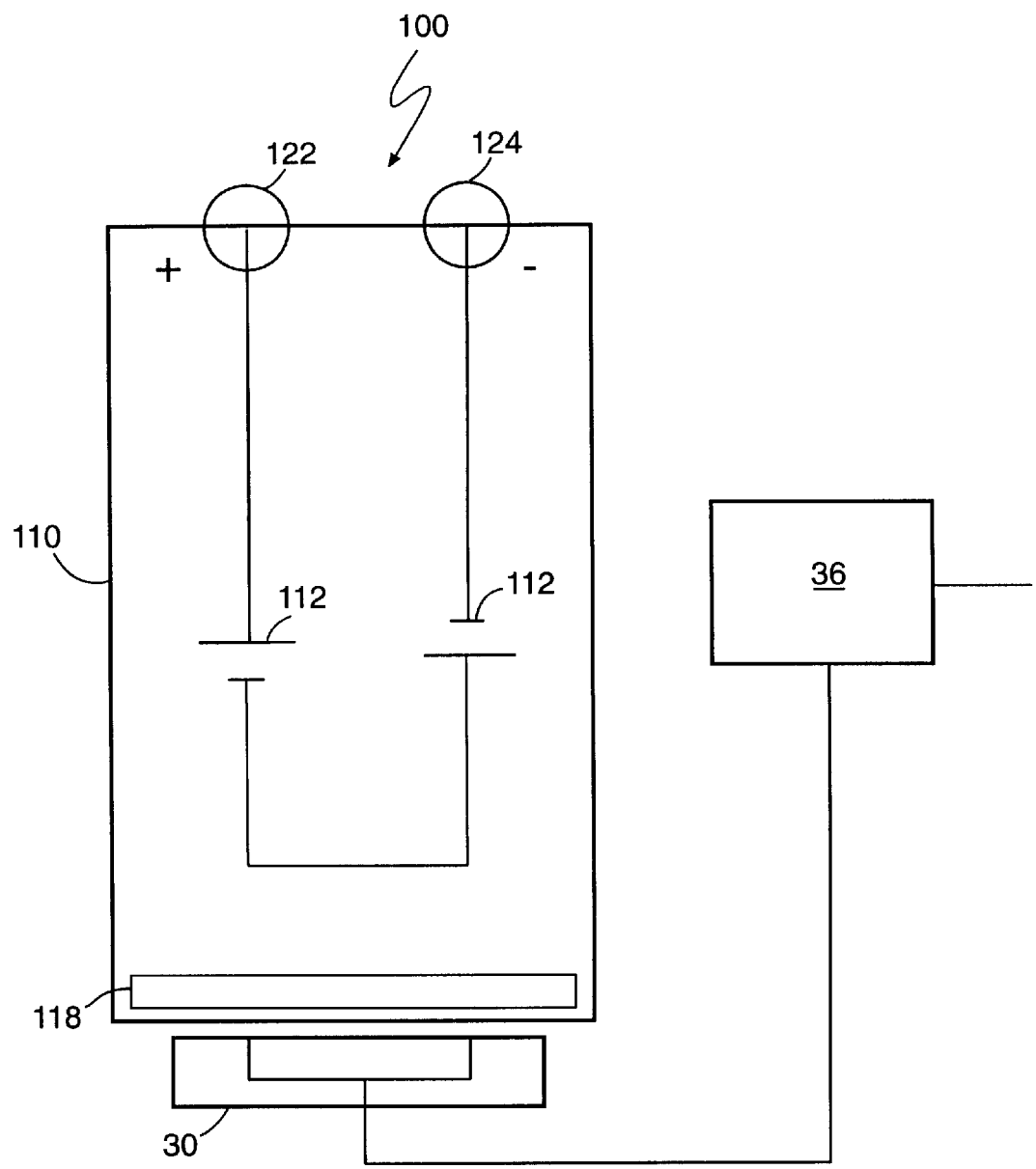
FIG. 5 is a schematic representation of the battery pack of FIG. 4 showing the lack of electrical connection between the battery cells and the battery contact of the present invention.

In contrast with the loose battery cell 132 battery power source 100 of FIG. 3, a rechargeable battery pack 110 type battery power source 100 is shown in FIG. 4 and schematically in FIG. 5. The battery pack 110 includes one more battery cells 112 of a rechargeable type and a plurality of terminals 122,124. The battery cells 112 of the battery pack 110 are not allowed to make electrical contact with the battery contact 30. Preferably, the battery cells 112 of the battery pack 110 are isolated from the battery contact 30 by insulation 118 such a plastic, kapton, phenolic or similar high-dielectric material. As shown in FIG. 5, the electrical circuit connecting the battery cells 112 of the battery pack 110 is fully internal to the battery pack 110 and does not include the battery contact 30. As such, the loose battery detection circuit 36 should not detect any voltage level or current associated with the battery contact 30. If no voltage level or current is detected by the loose battery detection circuit 36, the loose battery detection circuit 36 does not interrupt or disable the battery charging function of the battery charging circuit 18.

Thus, if the battery power source 100 is a battery pack 110, there should be no voltage level or current associated with the battery contact 30 because it is isolated from the battery cells 112 by the insulation 118. In such situations, charging is not disabled by the loose battery detection circuit 36. On the other hand, if the battery power source 100 is loose battery cells 132, then there should be a voltage level or current associated with the battery contact 30 because it forms part of the electrical path between the loose battery cells 132. In such situations, charging by the battery charging circuit 18 is disabled by the loose battery detection circuit 36.

The discussion above has assumed that the battery charging circuit 18 comprises part of the wireless communications device 10. However, the present invention also applies to stand alone battery chargers (which typically internally include battery charging circuits 18). For stand alone battery chargers, it is preferred that the loose battery detection circuit 36 communicate directly with the battery charging circuit 18, thereby obviating the need for a microprocessor 16. The battery contact 30, loose battery detection circuit 36, and the battery charging circuit 18 function as described above. Note that stand alone battery rechargers may also perform other functions such as facilitating hands-free operation of wireless communications devices 10.

The discussion above has assumed that all battery packs 110 are rechargeable; however, some battery packs 110 may not be rechargeable. If the non-rechargeable battery packs 110 are designed to allow (or require) the battery contact 30 to form part of the electrical path between individual cells 112 in the non-rechargeable battery pack 110, the present invention also functions to preclude recharging of battery packs 110 containing non-rechargeable battery cells 112. In an electrical sense, such non-rechargeable battery packs 110 would appear as loose battery cells 132 to the loose battery detection circuit 36, resulting in battery charging by the battery charging circuit 18 being disabled.

Note that the term "battery pack" 110 as used herein means the combination of battery cell 112 chemistry/composition and the number and size of such cells 112 in a battery pack 110. For instance, one battery pack type could be four size AA liquid lithium battery cells 112, another battery pack type could be six size AA NiMH battery cells 112, and still another battery pack type could be one size C NiCd battery cell 112.

The discussion above has used a microprocessor 16 as an example of a logic circuit; however, a microprocessor 16 per se need not be employed. Instead, dedicated discrete logic circuits may be used or other circuits within the wireless communications device 10 or stand alone recharger may be used to perform equivalent functions.

The present invention encompasses any wireless communications device 10 which is powered by a battery power source 100 and is designed to be able to recharge the battery power source 100. Examples of such wireless communications devices 10 include cellular telephones, handheld or personal computers, personal communications assistants, pagers, and the like. Also, as mentioned above, a stand alone battery charger may take the place of the wireless communications device 10.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method for controlling a battery charging circuit of a battery recharging device so as to disable recharging in response to the installation of loose battery cells in the battery recharging device, comprising:
   a) operatively engaging a battery contact between at least two of said loose battery cells;
   b) sensing an electrical signal associated with said battery contact generated by electrical current flowing from one loose battery cell to another via said battery contact;
   c) disabling said battery charging circuit when said electrical signal is sensed so as to block charging of said loose battery cells by said battery charging circuit.

2. The method of claim 1 wherein said recharging device is a wireless communications device.

3. The method of claim 1 wherein said recharging device is a stand alone battery recharger.

4. The method of claim 1 wherein said electrical signal is a voltage level greater than zero.

5. The method of claim 1 wherein said electrical signal is an electrical current greater than zero.

6. The method of claim 1 wherein a battery detection circuit performs said sensing.

7. A battery recharging device, comprising
   a) a battery power source for powering a wireless communications device;
   b) a battery charging circuit;
   c) a battery contact in communication with said battery charging circuit and disposed adjacent to said battery power source;
   d) wherein said battery recharging device has a first operational mode wherein said battery charging circuit is enabled and a second operational mode wherein said battery charging circuit is disabled,
   e) wherein said battery recharging device operates according to said first operational mode when said battery power source is isolated from said battery contact; and
   f) wherein said battery recharging device operates according to said second operational mode when said battery power source is operatively engaged with said battery contact so as to have electrical current from said battery power source flow through said battery contact.

8. The battery recharging device of claim 7 further comprising a battery detection circuit in communication with said battery contact and said battery charging circuit.

9. The battery recharging device of claim 7 wherein said battery power source includes a plurality of loose battery cells.

10. The battery recharging device of claim 7 wherein said battery power source includes a battery pack having insulation disposed proximate to said battery contact so as to block electrical contact between said battery pack and said battery contact.

11. The battery recharging device of claim 7 wherein said battery recharging device is a wireless communications device.

12. The device of claim 11 wherein said wireless communications device is a cellular telephone.

13. A battery recharging device, comprising
   a) a battery power source for powering a wireless communications device;
   b) a battery charging circuit;
   c) a battery contact disposed adjacent to and in physical contact with said battery power source;
   d) a battery detection circuit in communication with said battery contact and said battery charging circuit for sensing the presence of voltage in said battery contact;
   e) wherein said battery recharging device has a first operational mode wherein said battery charging circuit is enabled and a second operational mode wherein said battery charging circuit is disabled;
   f) wherein said battery detection circuit causes said battery recharging device to operate according to said first operational mode when said battery detection circuit senses the absence of a voltage in said battery contact; and
   g) wherein said battery detection circuit causes said battery recharging device to operate according to said second operational mode when said battery detection circuit senses the presence of a voltage in said battery contact.

14. The battery recharging device of claim 13 wherein said battery power source includes a plurality of loose battery cells.

15. The battery recharging device of claim 13 wherein said battery power source includes a battery pack having insulation disposed proximate to said battery contact so as to block electrical contact between said battery pack and said battery contact.

16. The battery recharging device of claim 13 wherein said battery recharging device is a wireless communications device.

17. The device of claim 16 wherein said wireless communications device is a cellular telephone.

* * * * *